(12) United States Patent
Goff et al.

(10) Patent No.: US 8,581,548 B2
(45) Date of Patent: Nov. 12, 2013

(54) INTEGRATED CELL BALANCING SYSTEM, METHOD, AND COMPUTER PROGRAM FOR MULTI-CELL BATTERIES

(75) Inventors: Lonnie Calvin Goff, Tempe, AZ (US); Michael Conley, Thousand Oaks, CA (US); Mark Eidson, Tempe, AZ (US)

(73) Assignee: 4 Peak Technology LLC, Tempe, AZ (US)

( * ) Notice: Subject to any disclaimer, the term of this patent is extended or adjusted under 35 U.S.C. 154(b) by 503 days.

(21) Appl. No.: 12/655,275

(22) Filed: Dec. 28, 2009

(65) Prior Publication Data

US 2011/0156648 A1 Jun. 30, 2011

(51) Int. Cl.
*H02J 7/00* (2006.01)

(52) U.S. Cl.
USPC ............................ 320/116; 320/134; 320/119

(58) Field of Classification Search
USPC .......................................................... 320/116
See application file for complete search history.

(56) References Cited

U.S. PATENT DOCUMENTS

| | | | |
|---|---|---|---|
| 3,440,100 A | 4/1969 | Ardanuy et al. |
| 4,012,681 A | 3/1977 | Finger et al. |
| 4,229,687 A | 10/1980 | Newman |
| 4,234,840 A | 11/1980 | Konrad et al. |
| 4,289,836 A | 9/1981 | Lemelson |
| 4,388,584 A | 6/1983 | Dahl et al. |
| 4,564,798 A | 1/1986 | Young |
| 4,586,788 A | 5/1986 | Hansen |
| 4,665,370 A | 5/1987 | Holland |
| 4,708,918 A | 11/1987 | Fitzgerald et al. |
| 4,866,428 A | 9/1989 | Hinkle |
| 4,929,931 A | 5/1990 | McCuen |
| 4,937,528 A | 6/1990 | Palanisamy |
| 5,079,716 A | 1/1992 | Lenhardt et al. |
| 5,162,741 A | 11/1992 | Bates |
| 5,349,535 A | 9/1994 | Gupta |
| 5,493,199 A | 2/1996 | Koenck et al. |
| 5,495,503 A | 2/1996 | King et al. |
| 5,534,759 A | 7/1996 | Evans et al. |
| 5,607,794 A | 3/1997 | Koenig |
| 5,625,337 A | 4/1997 | Medawar |
| 5,656,919 A | 8/1997 | Proctor et al. |
| 5,691,742 A | 11/1997 | O'Connor et al. |
| 5,699,050 A | 12/1997 | Kanazawa |
| 5,710,503 A | 1/1998 | Sideris et al. |

(Continued)

OTHER PUBLICATIONS

U.S. Appl. No. 12/070,793, Office Action dated Feb. 1, 2011.

(Continued)

*Primary Examiner* — Arun Williams
(74) *Attorney, Agent, or Firm* — Larry E. Henneman, Jr.; Gregory P. Gibson; Henneman & Associates PLC (57) ABSTRACT

A cell balancing software program that executes on a computer system embedded inside a multi-cell battery and includes a means to control an external charging system. When a charge imbalance is detected between the cells, a cell balancing algorithm is selected from a plurality of cell-balancing algorithms and is executed. The executed algorithm causes a charge request, which specifies desired charging parameter(s), to be generated, and the charge request is transmitted to the external charging system. After the external charging system charges the battery according to the charge request, the effectiveness of the cell-balancing algorithm can be evaluated and stored in a history. The history can be used to select cell balancing algorithm(s) for future cell balancing.

64 Claims, 4 Drawing Sheets

(56) References Cited

U.S. PATENT DOCUMENTS

| | | | |
|---|---|---|---|
| 5,760,587 | A | 6/1998 | Harvey |
| 5,767,659 | A | 6/1998 | Farley |
| 5,912,547 | A | 6/1999 | Grabon |
| 6,107,802 | A | 8/2000 | Matthews et al. |
| 6,173,350 | B1 | 1/2001 | Hudson et al. |
| 6,211,644 | B1 | 4/2001 | Wendelrup et al. |
| 6,222,345 | B1 | 4/2001 | Yamanashi |
| 6,400,123 | B1 | 6/2002 | Bean et al. |
| 6,507,169 | B1 | 1/2003 | Holtom et al. |
| 6,549,014 | B1 | 4/2003 | Kutkut et al. |
| 6,611,740 | B2 | 8/2003 | Lowrey et al. |
| 6,710,578 | B1 | 3/2004 | Sklovsky |
| 6,791,464 | B2 | 9/2004 | Huang |
| 6,795,782 | B2 | 9/2004 | Bertness et al. |
| 6,983,212 | B2 | 1/2006 | Burns |
| 7,061,208 | B2 | 6/2006 | Nishihata et al. |
| 7,116,216 | B2 | 10/2006 | Andreasen et al. |
| 7,126,341 | B2 | 10/2006 | Bertness et al. |
| 7,445,870 | B2 | 11/2008 | Taguchi et al. |
| 7,786,851 | B2 | 8/2010 | Drew et al. |
| 7,928,735 | B2 | 4/2011 | Huang et al. |
| 8,102,145 | B2 | 1/2012 | Merrill et al. |
| 2002/0175655 | A1 | 11/2002 | Huykman et al. |
| 2003/0051928 | A1 | 3/2003 | Raftari et al. |
| 2003/0139888 | A1* | 7/2003 | Burns ............................ 702/63 |
| 2004/0056640 | A1 | 3/2004 | Valand |
| 2004/0099846 | A1 | 5/2004 | Lee et al. |
| 2005/0162172 | A1 | 7/2005 | Bertness |
| 2005/0177288 | A1 | 8/2005 | Sullivan et al. |
| 2005/0218902 | A1 | 10/2005 | Restaino et al. |
| 2005/0275383 | A1 | 12/2005 | Ishishita |
| 2006/0028172 | A1 | 2/2006 | Vaillancourt et al. |
| 2006/0043933 | A1 | 3/2006 | Latinis |
| 2006/0118157 | A1 | 6/2006 | Johnson et al. |
| 2006/0152224 | A1 | 7/2006 | Kim et al. |
| 2006/0186857 | A1 | 8/2006 | Matty et al. |
| 2006/0217914 | A1 | 9/2006 | Bertness |
| 2007/0069734 | A1 | 3/2007 | Bertness |
| 2007/0075679 | A1 | 4/2007 | Ha et al. |
| 2007/0090844 | A1 | 4/2007 | Klang |
| 2007/0241614 | A1 | 10/2007 | Busdiecker et al. |
| 2008/0239628 | A1 | 10/2008 | Tatebayashi et al. |
| 2008/0252437 | A1 | 10/2008 | Bertness et al. |
| 2008/0311466 | A1 | 12/2008 | Yang et al. |
| 2009/0100995 | A1 | 4/2009 | Fisher |
| 2009/0144622 | A1 | 6/2009 | Evans et al. |
| 2009/0210736 | A1 | 8/2009 | Goff et al. |
| 2009/0212781 | A1 | 8/2009 | Bertness et al. |
| 2009/0228171 | A1 | 9/2009 | Goff et al. |
| 2009/0246607 | A1* | 10/2009 | Shinyashiki et al. ........... 429/90 |
| 2009/0322340 | A1 | 12/2009 | Zhang et al. |
| 2010/0174498 | A1 | 7/2010 | Goff et al. |
| 2010/0179778 | A1 | 7/2010 | Goff et al. |
| 2010/0217551 | A1 | 8/2010 | Goff et al. |
| 2010/0292942 | A1 | 11/2010 | Golf et al. |
| 2011/0048485 | A1 | 3/2011 | Goff et al. |

OTHER PUBLICATIONS

U.S. Appl. No. 12/070,793, Office Action dated Oct. 13, 2011.
U.S. Appl. No. 12/070,793, Interview Summary dated Feb. 21, 2012.
U.S. Appl. No. 12/075,212, Office Action dated Mar. 18, 2011.
U.S. Appl. No. 12/075,212, Office Action dated Nov. 2, 2011.
U.S. Appl. No. 12/075,212, Interview Summary dated Feb. 21, 2012.
U.S. Appl. No. 12/075,212, Office Action dated May 8, 2012.
U.S. Appl. No. 12/319,544, Office Action dated Jul. 20, 2011.
U.S. Appl. No. 12/319,544, Office Action dated Jan. 23, 2012.
U.S. Appl. No. 12/319,544, Interview Summary dated Feb. 24, 2012.
U.S. Appl. No. 12/321,310, Office Action dated Dec. 3, 2010.
U.S. Appl. No. 12/321,310, Office Action dated May 9, 2011.
U.S. Appl. No. 12/321,310, Office Action dated Dec. 20, 2011.
U.S. Appl. No. 12/321,310, Interview Summary dated Feb. 17, 2012.
U.S. Appl. No. 12/321,310, Office Action dated Apr. 20, 2012.
U.S. Appl. No. 12/380,236, Office Action dated May 31, 2011.
U.S. Appl. No. 12/380,236, Office Action dated Jan. 30, 2012.
U.S. Appl. No. 12/454,454, Office Action dated Jun. 13, 2011.
U.S. Appl. No. 12/454,454, Office Action dated Apr. 25, 2012.
U.S. Appl. No. 12/584,252, Office Action dated Aug. 17, 2011.
U.S. Appl. No. 12/584,252, Office Action dated Jan. 19, 2012.
U.S. Appl. No. 12/075,212, Interview Summary dated Jul. 3, 2012.
U.S. Appl. No. 12/075,212, Notice of Allowance dated Dec. 11, 2012.
U.S. Appl. No. 13/272,905, OA dated Dec. 21, 2012.
U.S. Appl. No. 12/319,544, Office Action dated May 25, 2012.
U.S. Appl. No. 12/319,544, Notice of Allowance dated Oct. 16, 2012.
U.S. Appl. No. 12/321,310, Interview Summary dated Jul. 10, 2012.
U.S. Appl. No. 12/380,236, Office Action dated Sep. 7, 2012.

* cited by examiner

INTEGRATED CELL BALANCING SYSTEM, METHOD, AND COMPUTER PROGRAM FOR MULTI-CELL BATTERIES

CROSS REFERENCE TO RELATED APPLICATIONS

This application is related to the following applications that have all been filed by the present inventors. Ser. No. 12/321,310 filed on Jan. 15, 2009 and entitled "Embedded Monitoring System for Batteries". Ser. No. 12/380,236 filed on Feb. 25, 2009 and entitled "Embedded Microprocessor System for Vehicular Batteries". And Ser. No. 12/454,454 filed on May 18, 2009 and entitled "Embedded Algorithms for Vehicular Batteries".

FEDERALLY SPONSORED RESEARCH OR DEVELOPMENT

Not Applicable

SEQUENCE LISTING, TABLE OR COMPUTER PROGRAM LISTING ON CD

Not Applicable

BACKGROUND OF THE INVENTION

1. Field of Invention

The present invention relates to battery technology and the field of computers. In particular it relates to how a computer system embedded in a multi-cell battery can, in conjunction with an external intelligent charging system, perform cell balancing.

2. Prior Art

The typical automobile lead-acid starter battery consists of six electrochemical cells embedded in a polymer case. Because the cells are encased, cell voltage measurements cannot be taken, the temperature or pressure inside the battery is not known and for those batteries without filler caps the level of the electrolyte cannot be determined.

When the voltage of individual cells inside a lead-acid battery differ by as little as one one-hundredth of a volt, the health of the battery is in jeopardy. An imbalance causes weaker cells to become progressively undercharged and the stronger cells to suffer the consequences of being consistently overcharged. Unless this imbalance can be quickly ameliorated the battery will prematurely fail.

Cell balance is typically restored in lead-acid batteries by temporarily overcharging the battery at a voltage of 14.4 volts for 15 minutes in an attempt to bring weak cells into alignment. This approach is a risky proposition. The external charging system does not know the voltage of each individual cell so does not know if or when to apply a cell balancing routine nor will it know if the cell balancing attempt was successful. The external charging system also does not know the level of the electrolyte of each cell or the internal temperature and pressure of the battery. If the strong cells are excessively overcharged, their positive plates will disintegrate or buckle and the excessive temperature generated in the cell by overcharging will cause lose of electrolyte. On the other hand, if the weak cells are not sufficiently charged, the cell imbalance will remain and the battery will die prematurely.

BRIEF SUMMARY OF THE INVENTION

The present invention makes use of computer systems that are described by the present inventors in application Ser. No. 12/321,310 filed on Jan. 15, 2009 entitled "Embedded Monitoring System for Batteries", application Ser. No. 12/380,236 filed on Feb. 25, 2009 entitled "Embedded Microprocessor System for Vehicular Batteries" and application Ser. No. 12/454,454 filed on May 18, 2009 entitled "Embedded Algorithms for Vehicular Batteries". These computer systems are designed to reside inside the battery and include facilities for measuring the individual cell voltages, the electrolyte level of each cell and the internal temperature and pressure of the battery. These computer systems also have a means to store and execute battery management algorithms as well as exchange data and commands with external devices such as intelligent battery chargers and intelligent automobile alternator systems.

What is missing in the prior art is the ability to first detect a cell imbalance inside the lead-acid battery and then to carefully control the process by which the imbalance is ameliorated. The present invention makes use of a computer system that can detect such an imbalance. Once detected, a closed loop control path is established with an external intelligent charging system. Different charge requests are made of the intelligent charger. All the while the battery's internal state is carefully monitored to avoid permanent damage.

A series of charge requests followed by a proper assessment of the benefit of the charging procedure should be properly viewed as a cell-balancing algorithm. A cell balancing algorithm can be made to mimic the typical 14.4 volt flat charge rate of 15 minutes that is performed by many of today's battery chargers. A different cell balancing algorithm can be made to issue a much higher voltage request for a much shorter period of time. Still other algorithms can issue cyclic voltage requests that create pulse charging. At the termination of each algorithm a check is made to see if the cells have been brought back into balance. If not, a different algorithm is tried.

This invention can also be properly viewed as a research tool. There is a multitude of things that can cause a cell imbalance. Some examples are partial shorts between positive and negative plates, partial shorts between plates and straps, improper electrolytic levels, crystallized lead sulfate accumulations and incorrect specific gravity. This invention is heuristic in nature in that there is no established methodology that correlates or matches charging schemes to the underlying cause of a cell imbalance. A charging regime is tried by a cell balancing algorithm and its results are monitored. If the cell imbalance persists a different cell balancing algorithm is tried. This next charging regime may be similar to the previous attempt or may be radically different depending upon any detectable improvements. If no improvement occurred, the next charging regime will depart from the previous. The internal state of the battery continues to be monitored to insure no harm is being done. When a successful result is determined the successful technique is saved in a history file. This history is made readily available over the communication path normally established between battery and battery charging system. If the underlying cause of the imbalance is not apparent, such as plate sulfation, a post mortem can be performed on the battery in order to more properly correlate successful cell balancing techniques to the root cause of the imbalance. With this information battery manufacturers will have better insight into the failure mechanisms of their batteries while automobile and battery charger manufacturers will be able to build better charging systems.

DETAILED DESCRIPTION OF THE INVENTION

The following descriptions are provided to enable any person skilled in the art to make and use the invention and are provided in the context of two particular embodiments. Various modifications to these embodiments are possible and the generic principles defined herein may be applied to these and other embodiments without departing from the spirit and scope of the invention. Both embodiments described herein perform cell balancing by a computer system embedded inside a lead-acid battery. Special notification is made with regard to battery technology. The generic principles described herein apply to any battery type whose construction precludes the measurement of individual cell voltages. It is not necessarily limited to lead-acid batteries. Thus the invention is not intended to be limited to the embodiments shown but is to be accorded the widest scope consistent with the principles, features and teachings disclosed herein.

In accordance with one embodiment, the present invention makes use of a computer system that resides inside a flooded lead-acid battery. The computer system includes a means to measure individual cell voltages, the level of the electrolyte in each cell and the internal temperature of the battery. The computer system includes a means to communicate with an external battery charging system through the power cable attached to the battery. The computer system's central processing unit includes a means to measure time and includes facilities for storing data. The computer system's non-volatile memory includes algorithms that have a means to detect cell imbalances and to perform cell balancing by sending charge request messages to an external charging system.

Figure 1:
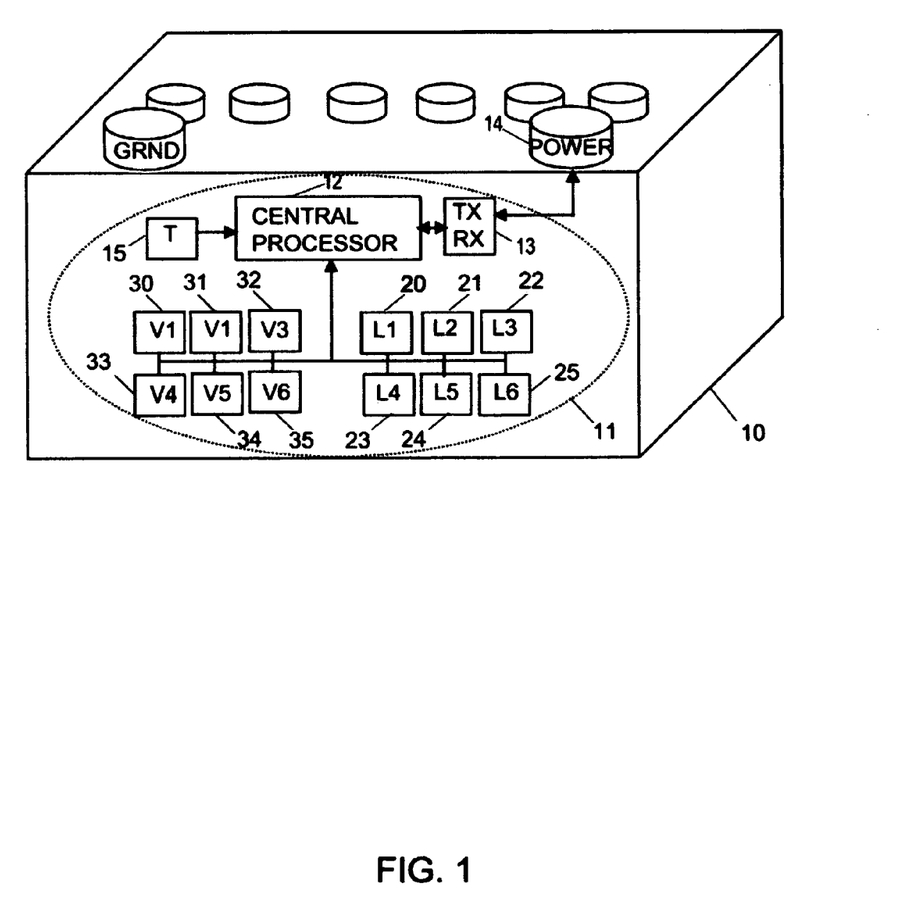
FIG. 1 is a block diagram of a computer-based system shown embedded inside a flooded lead-acid battery that has six internal cells. This computer system includes a means for measuring cell voltages, cell electrolytic levels and battery temperature. The computer system includes a means to communicate with an external battery charging system. The computer system includes a means to execute algorithms that perform cell balancing by issuing charge request messages to an external charger.

FIG. 1 is a block diagram illustrating computer system 11 shown embedded inside flooded lead-acid battery 10. Computer system 11 includes a data path to power connector 14 through transceiver 13. Transceiver 13 is used to transfer information between central processor 12 and one or more external devices (not shown) attached conductively to power connector 14. Sensors 30-35 measure individual cell voltages and pass this information to central processor 12. Sensors 20-25 provide the level of the electrolyte in each of the battery's cells and pass this information to central processor 12. Temperature sensor 15 measures the temperature inside the battery's case and passes this information to central processor 12.

Figure 1A:
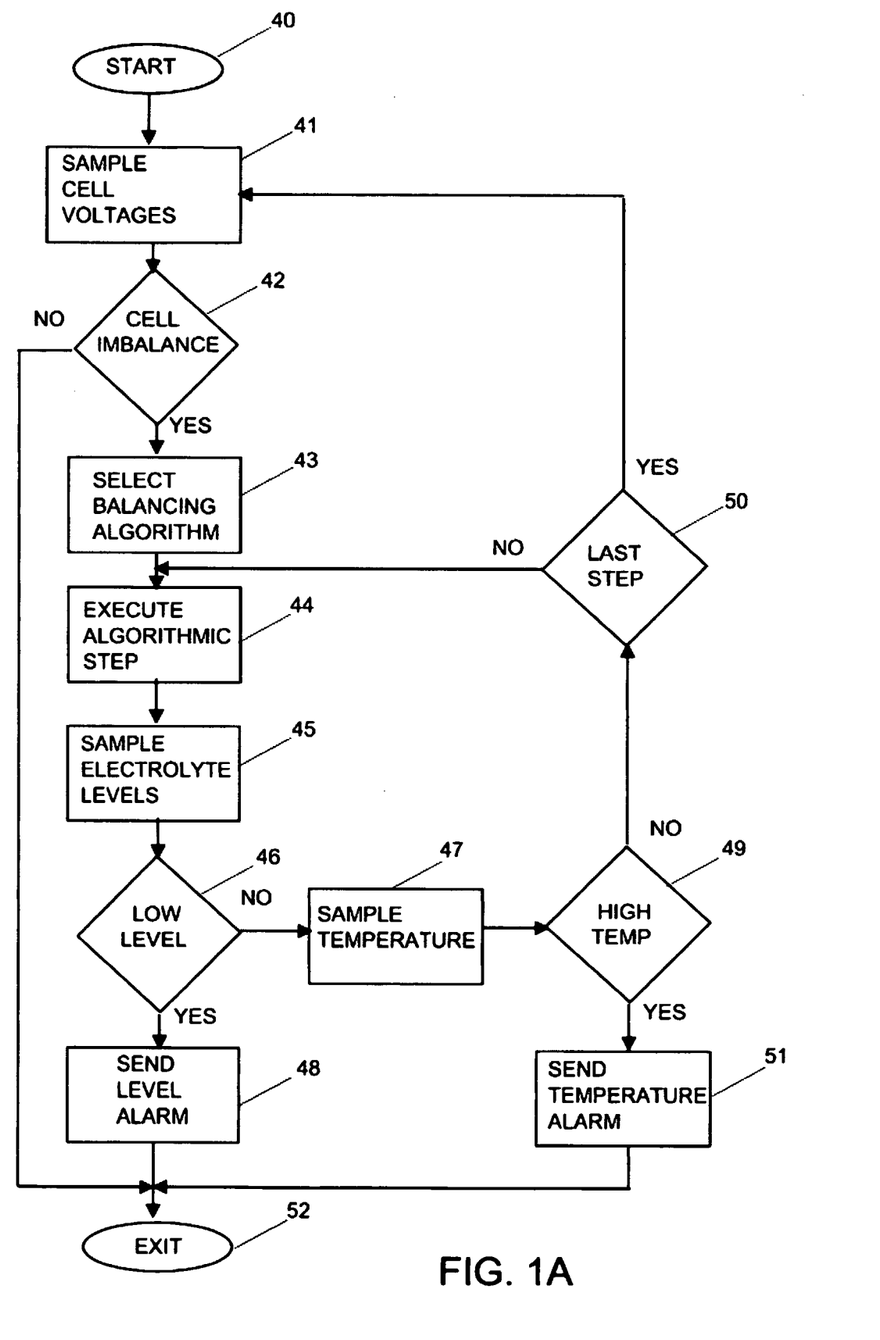
FIG. 1A is a flow chart illustrating the steps taken by one embodiment of the cell balancing computer program of this invention when it is executed by the computer system of FIG. 1.

FIG. 1A is a flowchart illustrating those steps taken by a cell balancing program when executed by central processor unit 12 of FIG. 1 in order to detect and correct a cell voltage imbalance in battery 10 of FIG. 1. Execution of the cell-balancing program is initiated at step 40 of FIG. 1A by central processor 12 of FIG. 1. In step 41 of FIG. 1A the voltage of each cell is sampled by central processor unit 12 of FIG. 1 using voltage sensors 30-35 of FIG. 1. At step 42 of FIG. 1A a comparison is made between individual cell voltages and program control transfers to either step 43 if an imbalance is detected or, if not, to step 52 where the cell balancing program is exited. At step 43 of FIG. 1A a cell balancing algorithm is selected from a number of possible algorithms. This selection is based on factors that include the extent of the imbalance, the age of the battery, the temperature of the battery and the level of the electrolytes. At step 44 of FIG. 1A the first step of the algorithm is executed. The first step causes central processor 12 of FIG. 1 to send a charge request message to the external charging system attached to the power cable (not shown) through transceiver 13 and power connector 14 of FIG. 1. This, in turn, causes the voltage requested in the charge request message to be applied to battery 10 of FIG. 1 by the external charging system (not shown). Program control then proceeds to step 45 of FIG. 1A where the level of the electrolyte of each individual cell is sampled by central processor 12 of FIG. 1 using the electrolytic level sensors 20-25 of FIG. 1. At step 46 of FIG. 1A program control transfers to either step 48 of FIG. 1A if the electrolytic level of any cell is too low for the cell balancing algorithm to continue or to step 47 if the all the electrolytic levels are good. If program control transferred to step 48, central processor 12 of FIG. 1 will send an alarm message across the power cable (not shown) using transceiver 13 of FIG. 1. Program control then passes to step 52 where the cell balancing program is exited. If program control transferred to step 47 of FIG. 1A the temperature sensor 15 of FIG. 1 is sampled and program control proceeds to step 49. Step 49 causes program control to transfer to either step 51 of FIG. 1A if the battery's temperature is too high for the cell balancing algorithm to continue or, if not, to step 50. At step 51 central processor 12 of FIG. 1 sends a temperature alarm message across the power cable (not shown) attached to power connector 14 of FIG. 1 and program control passes to step 52 where the cell balancing program is exited. If the temperature of the battery as read at step 47 of FIG. 1A is not excessive, step 49 of FIG. 1A causes program control to pass to step 50 of FIG. 1A. At step 50 a check is made to see if the last step of the cell balancing algorithm has been executed. If the last step has not been executed, program control returns to step 44 where the next step of the cell balancing algorithm is executed and the balancing algorithm repeats. If the check at step 50 of FIG. 1A determines that the algorithm has finished, program control proceeds to step 41 of FIG. 1A and the cell balancing program repeats.

In accordance with another embodiment, the present invention makes use of a computer system that resides inside a sealed lead-acid battery. The computer system includes a means to measure individual cell voltages, the internal pressure of the battery and the internal temperature of the battery. The computer system includes a means to communicate with an external battery charging system through the power cable attached to the battery. The computer system's central processing unit includes a means to measure time and includes facilities for storing data. The computer system's non-volatile memory includes algorithms that have a means to detect cell imbalances and to perform cell balancing by sending charge request messages to an external charging system.

Figure 2:
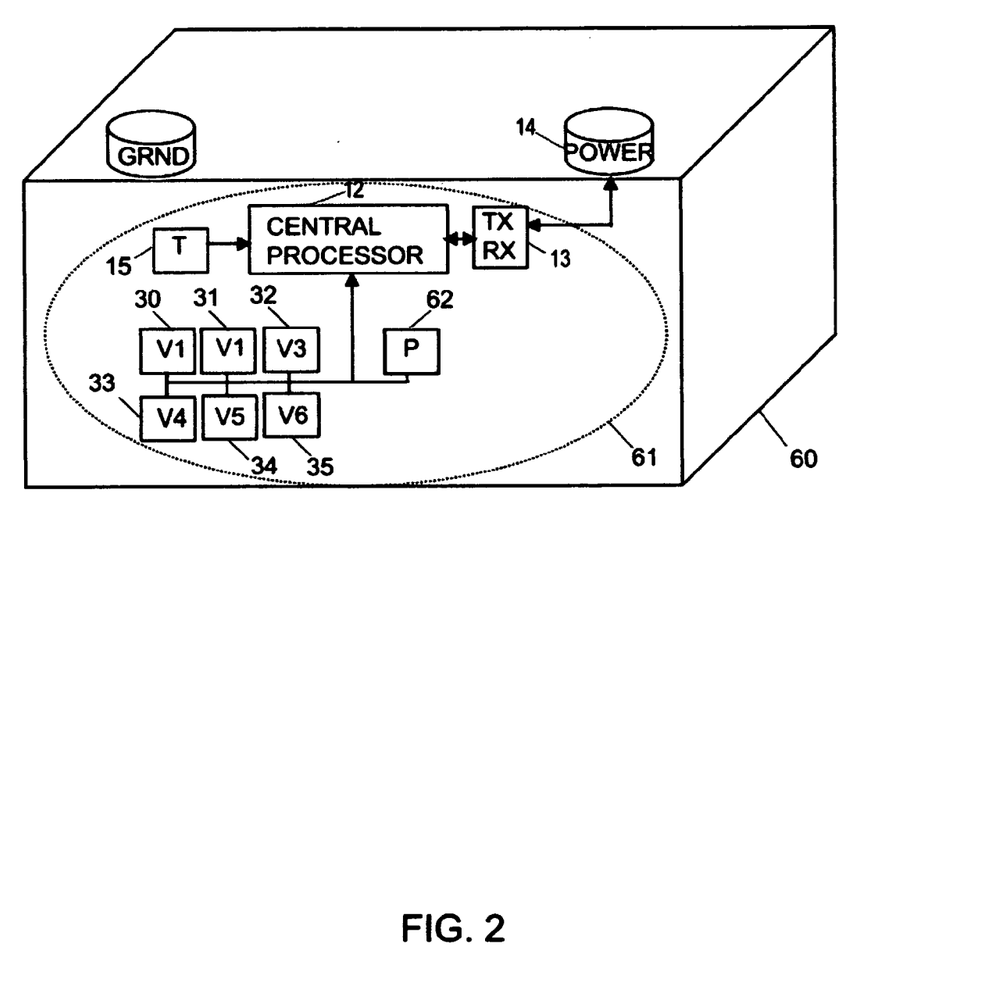
FIG. 2 is a block diagram of a computer-based system shown embedded inside a sealed lead-acid battery that has six internal cells. This computer system includes a means for measuring cell voltages, pressure and battery temperature. The computer system includes a means to communicate with an external battery charging system. The computer system includes a means to execute algorithms that perform cell balancing by issuing charge request messages to an external charger.

FIG. 2 is a block diagram illustrating computer system 61 shown embedded inside sealed lead-acid battery 60. Computer system 61 includes a data path to power connector 14 through transceiver 13. Transceiver 13 is used to transfer information between central processor 12 and one or more external devices (not shown) attached conductively to power connector 14. Sensors 30-35 measure individual cell voltages and pass this information to central processor 12. Pressure sensor 62 measures the pressure inside the sealed battery and passes this information to central processor 12. Temperature sensor 15 measures the temperature inside the battery's case and passes this information to central processor 12.

Figure 2A:
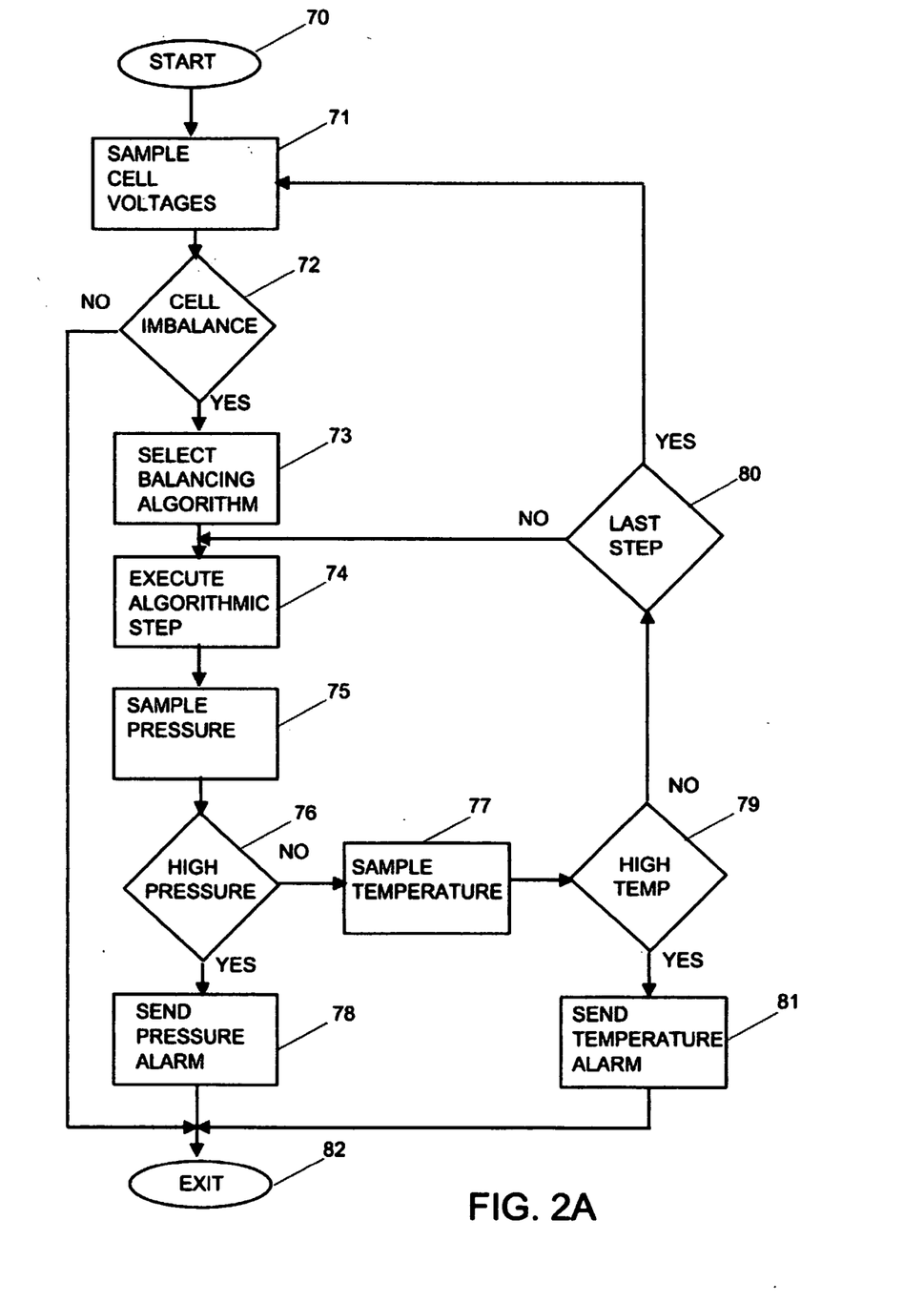
FIG. 2A is a flow chart illustrating the steps taken by another embodiment of the cell balancing computer program of this invention when it is executed by the computer system of FIG. 2.

FIG. 2A is a flowchart illustrating those steps taken by a cell balancing program when executed by central processor unit 12 of FIG. 2 in order to detect and correct a cell voltage imbalance in battery 60 of FIG. 2. Execution of the cell-balancing program is initiated at step 70 of FIG. 2A by central processor 12 of FIG. 2. In step 71 of FIG. 2A the voltage of each cell is sampled by central processor unit 12 of FIG. 2 using voltage sensors 30-35 of FIG. 2. At step 72 of FIG. 2A a comparison is made between individual cell voltages and program control transfers to either step 73 if an imbalance is detected or, if not, to step 2 where the cell balancing program is exited. At step 73 of FIG. 2A a cell balancing algorithm is selected from a number of possible algorithms. This selection is based on factors that include the extent of the imbalance, the age of the battery, the temperature of the battery and the level of the electrolytes. At step 74 of FIG. 2A the first step of the algorithm is executed. The first step causes central processor 12 of FIG. 2 to send a charge request message to the external charging system attached to the power cable (not shown) through transceiver 13 and power connector 14 of FIG. 2. This, in turn, causes the voltage requested in the charge request message to be applied to battery 60 of FIG. 2 by the external charging system (not shown). Program control then proceeds to step 75 of FIG. 2A where the internal pressure of the battery is sampled by central processor 12 of FIG. 2 using the pressure sensor 62 of FIG. 2. At step 76 of FIG. 2A program control transfers to either step 78 of FIG. 2A if the battery's pressure is too high for the cell balancing algorithm to continue or to step 77 if the pressure is not excessive. If program control transferred to step 78, central processor 12 of FIG. 2 will send a pressure alarm message across the power cable (not shown) using transceiver 13 of FIG. 2. Program control then passes to step 82 where the cell balancing program is exited. If program control transferred to step 77 of FIG. 2A the temperature sensor 15 of FIG. 2 is sampled and program control proceeds to step 79. Step 79 causes program control to transfer to either step 81 of FIG. 2A if the battery's temperature is too high for the cell balancing algorithm to continue or, if not, to step 80. At step 81 central processor 12 of FIG. 2 sends a temperature alarm message across the power cable (not shown) attached to power connector 14 of FIG. 2 and program control then passes to step 82 where the cell balancing program is exited. If the temperature of the battery as read at step 77 of FIG. 2A is not excessive, step 79 of FIG. 2A causes program control to pass to step 80 of FIG. 2A. At step 80 a check is made to see if the last step of the cell balancing algorithm has been executed. If the last step has not been executed, program control returns to step 74 where the next step of the cell balancing algorithm is executed and the balancing algorithm repeats. If the check at step 80 of FIG. 2A determines that the algorithm has finished, program control proceeds to step 71 of FIG. 2A and the cell balancing program repeats.

Advantage

This invention changes the age old paradigm whereby the battery charging system blindly controls the procedure by which the cells in a multi-cell battery, such as the ubiquitous twelve volt lead-acid battery, can be kept in balance. With this invention the battery is now in control. A closed loop system is established with the charging device. The battery knows when a cell is out of balance. The battery possesses the means to learn from trial and error which charge strategy works best to reduce or remove cell imbalances. The battery monitors its internal state to insure that no harm is done.

Because this invention is a computer program that executes on a computer system embedded inside a multi-cell battery it has access to the voltage of each individual cell and therefore can detect a cell imbalance.

Because this invention is a computer program that executes on a computer system embedded inside a multi-cell battery that includes a means to communicate to external charging systems, this invention has a means to control the amount and duration of charge applied to the battery when a cell balancing operation is in progress.

Because this invention is a computer program that executes on a computer system embedded inside a multi-cell battery it has access to the internal temperature of the battery, access to the internal pressure of the battery if the battery is a sealed unit and access to electrolytic levels if the battery contains liquid electrolyte. With this information this invention can insure that the battery is not damaged by the aggressive charging schemes used by cell balancing procedures.

What is claimed is:

1. A non-transitory computer software program comprising:
    means for configuring a computer system embedded inside a multi-cell battery for the purpose of executing cell balancing algorithms;
    means for communicating with an external battery charging system using said computer system;
    means for controlling the charge applied to said multi-cell battery using said communication means to said external battery charging system;
    means for detecting a charge imbalance in one or more cells of said multi-cell battery; and
    means for determining a safe and appropriate charge to be applied to said multi-cell battery by said external battery charging system in order to minimize a cell charge imbalance.

2. The computer software program of claim 1, further including a means to determine the internal battery temperature of said multi-cell battery and a means to use this information in determining said safe charge to be applied to said mufti-cell battery.

3. The computer software program of claim 1, further including a means to determine the internal battery pressure of said multi-cell battery and a means to use this information in determining said safe charge to be applied to said multi-cell battery.

4. The computer software program of claim 1, further including a means to determine the electrolytic level in one or more cells of said multi-cell battery and a means to use this information in determining said safe charge to be applied to said multi-cell battery.

5. The computer software program of claim 1, further including a means to determine both the internal battery temperature and the internal pressure of said multi-cell battery and a means to use this information in determining said safe charge to be applied to said multi-cell battery.

6. The computer software program of claim 1, further including a means to determine both the internal battery temperature and the electrolytic level in one or more cells of said multi-cell battery and a means to use this information in determining said safe charge to be applied to said multi-cell battery.

7. The computer software program of claim 1, further including a means to determine both the internal battery pressure and the electrolytic level in one or more cells of said multi-cell battery and a means to use this information in determining said safe charge to be applied to said multi-cell battery.

8. The computer software program of claim 1, further including a means to determine the internal battery temperature, a means to determine the internal battery pressure, a means to determine the electrolytic level in one or more cells of said multi-cell battery and a means to use this information in determining said safe charge to be applied to said multi-cell battery.

9. A non-transitory, computer software program comprising:
   means for configuring a computer system embedded inside a lead-acid multi-cell battery for the purpose of executing cell balancing algorithms;
   means for communicating with an external battery charging system using said computer system;
   means for controlling the charge applied to said lead-acid multi-cell battery using said communication means to said external battery charging system;
   means for detecting a charge imbalance in one or more cells of said lead-acid multi-cell battery; and
   means for determining a safe and appropriate charge to be applied to said lead-acid multi-cell battery by said external battery charging system in order to minimize a cell charge imbalance.

10. The computer software program of claim 9, further including a means to determine the internal battery temperature of said lead-acid multi-cell battery and a means to use this information in determining said safe charge to be applied to said lead-acid multi-cell battery.

11. The computer software program of claim 9, further including a means to determine the internal battery pressure of said lead-acid multi-cell battery and a means to use this information in determining said safe charge to be applied to said lead-acid multi-cell battery.

12. The computer software program of claim 9, further including a means to determine the electrolytic level in one or more cells of said lead-acid multi-cell battery and a means to use this information in determining said safe charge to be applied to said lead-acid multi-cell battery.

13. The computer software program of claim 9, further including a means to determine both the internal battery temperature and the internal pressure of said lead-acid multi-cell battery and a means to use this information in determining said safe charge to be applied to said lead-acid multi-cell battery.

14. The computer software program of claim 9, further including a means to determine both the internal battery temperature and the electrolytic level in one or more cells of said lead-acid multi-cell battery and a means to use this information in determining said safe charge to be applied to said lead-acid multi-cell battery.

15. The computer software program of claim 9, further including a means to determine both the internal battery pressure and to determine the electrolytic level in one or more cells of said lead-acid multi-cell battery and a means to use this information in determining said safe charge to be applied to said lead-acid multi-cell battery.

16. The computer software program of claim 9, further including a means to determine the internal battery temperature, a means to determine the internal battery pressure, a means to determine the electrolytic level in one or more cells of said lead-acid multi-cell battery and a means to use this information in determining said safe charge to be applied to said lead-acid multi-cell battery.

17. In a battery including a case, a plurality of cells enclosed in said case, and a terminal electrically coupled to said plurality of cells, a method for balancing the charge of each of said plurality of cells, said method comprising:
   generating sensor data using a sensor set disposed within said case, said sensor data including data indicative of a state of charge of each cell of said plurality of cells;
   analyzing said sensor data using a processing unit disposed within said case to detect a charge imbalance between one or more of said cells;
   executing a cell-balancing algorithm using said processing unit, said cell-balancing algorithm defining at least one battery charging parameter to be applied to said terminal of said battery to minimize said charge imbalance; and
   transmitting a charge request to an external device disposed outside said case, said charge request requesting that said battery be charged according to said at least one battery charging parameter.

18. The method of claim 17, further comprising selecting said cell-balancing algorithm from a plurality of cell-balancing algorithms stored in a memory disposed within said case.

19. The method of claim 18, further comprising:
   generating follow-up sensor data after said cell-balancing algorithm is executed, said follow-up sensor data indicative of a follow-up state of charge of each cell of said plurality of cells;
   analyzing said follow-up sensor data to determine an effectiveness of said selected cell-balancing algorithm at minimizing said charge imbalance; and
   storing a record indicative of said effectiveness as part of a cell-balancing history in said memory.

20. The method of claim 19, wherein said step of selecting said cell-balancing algorithm includes selecting said cell-balancing algorithm based on said cell-balancing history.

21. The method of claim 20, wherein said step of selecting said cell-balancing algorithm based on said cell-balancing history includes:
   analyzing said cell-balancing history to determine a successful cell-balancing algorithm from a plurality of previously-performed cell-balancing algorithms; and
   selecting the cell-balancing algorithm that corresponds to said successful cell-balancing algorithm.

22. The method of claim 18, wherein said step of selecting said cell-balancing algorithm includes selecting said cell-balancing algorithm based at least in part on said sensor data.

23. The method of claim 22, wherein said cell-balancing algorithm is selected based on the magnitude of said charge imbalance.

24. The method of claim 22, wherein:
   said sensor set includes at least one pressure sensor;
   said sensor data includes pressure data indicative of at least one pressure within said case; and
   said cell-balancing algorithm is selected based on said pressure data.

25. The method of claim 22, wherein:
   said sensor set includes at least one temperature sensor;
   said sensor data includes temperature data indicative of at least one temperature within said case; and said cell-balancing algorithm is selected based on said temperature data.

26. The method of claim 22, wherein:
said sensor set includes at least one electrolyte level sensor;
said sensor data includes electrolyte level data indicative of at least one electrolyte level within said case; and
said cell-balancing algorithm is selected based on said electrolyte level data.

27. The method of claim 22, wherein said step of selecting said cell-balancing algorithm includes selecting said cell-balancing algorithm based on the age of said battery.

28. The method of claim 17, further comprising aborting said cell-balancing algorithm.

29. The method of claim 28, wherein said step of aborting said cell-balancing algorithm includes transmitting an abort instruction to said external device, said abort instruction causing said external device to abort said charge request.

30. The method of claim 28, further comprising:
analyzing said sensor data to determine if an unsafe condition exists within said case of said battery; and
aborting said cell-balancing algorithm when said unsafe condition exists.

31. The method of claim 30, wherein:
at least some of said sensor data is generated while said battery is being charged according to said at least one battery charging parameter; and
said step of aborting said cell-balancing algorithm includes aborting said cell-balancing algorithm while said battery is being charged according to said at least one battery charging parameter.

32. The method of claim 30, wherein:
said sensor set includes at least one pressure sensor;
said sensor data is indicative of at least one pressure within said case; and
said step of aborting said cell-balancing algorithm includes aborting said cell-balancing algorithm if said at least one pressure within said case exceeds a predetermined pressure.

33. The method of claim 30, wherein:
said sensor set includes at least one temperature sensor;
said sensor data is indicative of at least one temperature within said case; and
said step of aborting said cell-balancing algorithm includes aborting said cell-balancing algorithm if said at least one temperature within said case exceeds a predetermined temperature.

34. The method of claim 30, wherein:
said sensor set includes at least one electrolyte level sensor disposed within said case;
said sensor data is indicative of at least one electrolyte level within said case; and
said step of aborting said cell-balancing algorithm includes aborting said cell-balancing algorithm if said at least one electrolyte level within said case is below a predetermined level.

35. The method of claim 17, further comprising:
measuring the time that passes after said step of transmitting said charge request to said external device; and
transmitting a subsequent charge request to said external device after a predetermined time has elapsed, said subsequent charge request changing said at least one battery charging parameter.

36. The method of claim 17, wherein said charge request specifies a voltage and a duration that said voltage is to be applied to said terminal of said battery.

37. The method of claim 17, wherein:
said sensor set includes at least one voltage sensor operative to indicate a voltage produced by each of said plurality of cells individually; and
said voltage produced by said each cell is indicative of said state of charge of said each cell.

38. The method of claim 17, wherein said battery is a multi-cell, sealed lead-acid battery.

39. The method of claim 17, wherein said external device is an external charging system.

40. A battery comprising:
a case;
a plurality of cells enclosed in said case;
a terminal electrically coupled to said plurality of cells;
a sensor set disposed within said case, said sensor set being operative to generate sensor data including data indicative of a state of charge of each cell of said plurality of cells;
a processing unit coupled to receive said sensor data, said processing unit being operative to
analyze said sensor data to detect a charge imbalance between one or more of said cells, and
execute a cell-balancing algorithm to define at least one battery charging parameter to be applied to said terminal of said battery to minimize said charge imbalance; and
an external interface coupled to said processing unit, said external interface being operative to transmit a charge request to an external device disposed outside said case, said charge request requesting that said battery be charged according to said at least one battery charging parameter.

41. The battery of claim 40, further comprising:
a memory disposed within said case and coupled to said processing unit; and wherein
said memory stores a plurality of cell-balancing algorithms, including said cell balancing algorithm; and
said processing unit is further operative to select said cell-balancing algorithm from said plurality of cell-balancing algorithms.

42. The battery of claim 41, wherein:
said sensor set is operative to generate follow-up sensor data after said cell-balancing algorithm is executed, said follow-up sensor data indicative of a follow-up state of charge of each cell of said plurality of cells; and
said processing unit is further operative to
analyze said follow-up sensor data to determine an effectiveness of said cell-balancing algorithm at minimizing said charge imbalance, and
write a record indicative of said effectiveness to a cell-balancing history stored in said memory.

43. The battery of claim 42, wherein said processing unit is further operative to select said cell-balancing algorithm based on said cell-balancing history.

44. The battery of claim 43, wherein said processing unit is operative to
analyze said cell-balancing history to determine a successful cell-balancing algorithm from a plurality of previously-performed cell-balancing algorithms; and
select the cell-balancing algorithm that corresponds to said successful cell-balancing algorithm.

45. The battery of claim 41, wherein said processing unit is operative to select said cell-balancing algorithm based at least in part on said sensor data.

46. The battery of claim 45, wherein said processing unit selects said cell-balancing algorithm based on the magnitude of said charge imbalance.

47. The battery of claim 45, wherein:
said sensor set includes at least one pressure sensor;
said sensor data includes pressure data indicative of at least one pressure within said case; and
said processing unit selects said cell-balancing algorithm based on said pressure data.

48. The battery of claim 45, wherein:
said sensor set includes at least one temperature sensor;
said sensor data includes temperature data indicative of at least one temperature within said case; and
said processing unit selects said cell-balancing algorithm based on said temperature data.

49. The battery of claim 45, wherein:
said sensor set includes at least one electrolyte level sensor;
said sensor data includes electrolyte level data indicative of at least one electrolyte level within said case; and
said processing unit selects said cell-balancing algorithm based on said electrolyte level data.

50. The battery of claim 45, wherein said processing unit is further operative to select said cell-balancing algorithm based on the age of said battery.

51. The battery of claim 40, wherein said processing unit is further operative to abort said cell-balancing algorithm.

52. The battery of claim 51, wherein said processing unit is further operative to cause said external interface to transmit an abort instruction to said external device, said abort instruction causing said external device to abort said charge request.

53. The battery of claim 51, wherein said processing unit is further operative to:
analyze said sensor data to determine if an unsafe condition exists within said case of said battery; and
abort said cell-balancing algorithm when said unsafe condition exists.

54. The battery of claim 53, wherein:
at least some of said sensor data is generated while said battery is being charged according to said at least one battery charging parameter; and
said processing unit is operative to abort said cell-balancing algorithm based on said sensor data generated while said battery is being charged according to said at least one battery charging parameter.

55. The battery of claim 53, wherein:
said sensor set includes at least one pressure sensor;
said sensor data is indicative of at least one pressure within said case; and
said processing unit is operative to abort said cell-balancing algorithm if said at least one pressure within said case exceeds a predetermined pressure.

56. The battery of claim 53, wherein:
said sensor set includes at least one temperature sensor;
said sensor data is indicative of at least one temperature within said case; and
said processing unit is operative to abort said cell-balancing algorithm if said at least one temperature within said case exceeds a predetermined temperature.

57. The battery of claim 53, wherein:
said sensor set includes at least one electrolyte level sensor disposed within said case;
said sensor data is indicative of at least one electrolyte level within said case; and
said processing unit is operative to abort said cell-balancing algorithm if said at least one electrolyte level within said case is below a predetermined level.

58. The battery of claim 40, further comprising:
a timer coupled to said processing unit and being operative to provide an indication of time; and wherein
said processing unit is further operative to measure the time that has passed since said charge request was transmitted to said external device, and
generate a subsequent charge request after a predetermined time has elapsed since said charge request was transmitted, said subsequent charge request changing said at least one battery charging parameter; and
said external interface is further operative to transmit said subsequent charge request to said external device.

59. The battery of claim 40, wherein said charge request specifies a voltage and a duration that said voltage is to be applied to said terminal of said battery.

60. The battery of claim 40, wherein:
said sensor set includes at least one voltage sensor operative to indicate a voltage produced by each of said plurality of cells individually; and
said voltage produced by said each cell is indicative of said state of charge of said each cell.

61. The battery of claim 40, wherein said battery is a multi-cell, sealed lead-acid battery.

62. The battery of claim 40, wherein said external device is an external charging system.

63. A battery comprising:
a case;
a plurality of cells enclosed in said case;
a terminal electrically coupled to said plurality of cells;
a sensor set disposed within said case, said sensor set being operative to generate sensor data including data indicative of a state of charge of each cell of said plurality of cells;
means for analyzing said sensor data to detect a charge imbalance between one or more of said cells;
means for defining at least one battery charging parameter to be applied to said terminal of said battery to minimize said charge imbalance; and
means for transmitting a charge request to an external device, said charge request requesting that said battery be charged according to said at least one battery charging parameter.

64. A non-transitory, electronically-readable storage medium having code embodied therein for causing an electronic device to:
generate sensor data indicative of a state of charge of each cell of a plurality of cells located within a case of a battery;
analyze said sensor data to detect a charge imbalance between one or more of said cells;
perform a cell-balancing algorithm to define at least one battery charging parameter to be applied to a terminal of said battery to minimize said charge imbalance, said terminal being electrically coupled to each of said plurality of cells; and
transmit a charge request to an external device disposed outside said case, said charge request requesting that said battery be charged according to said at least one battery charging parameter.

* * * * *